F. M. ROBB.
OPERATING MECHANISM FOR FANS.
APPLICATION FILED AUG. 10, 1917.
1,279,443.
Patented Sept. 17, 1918.
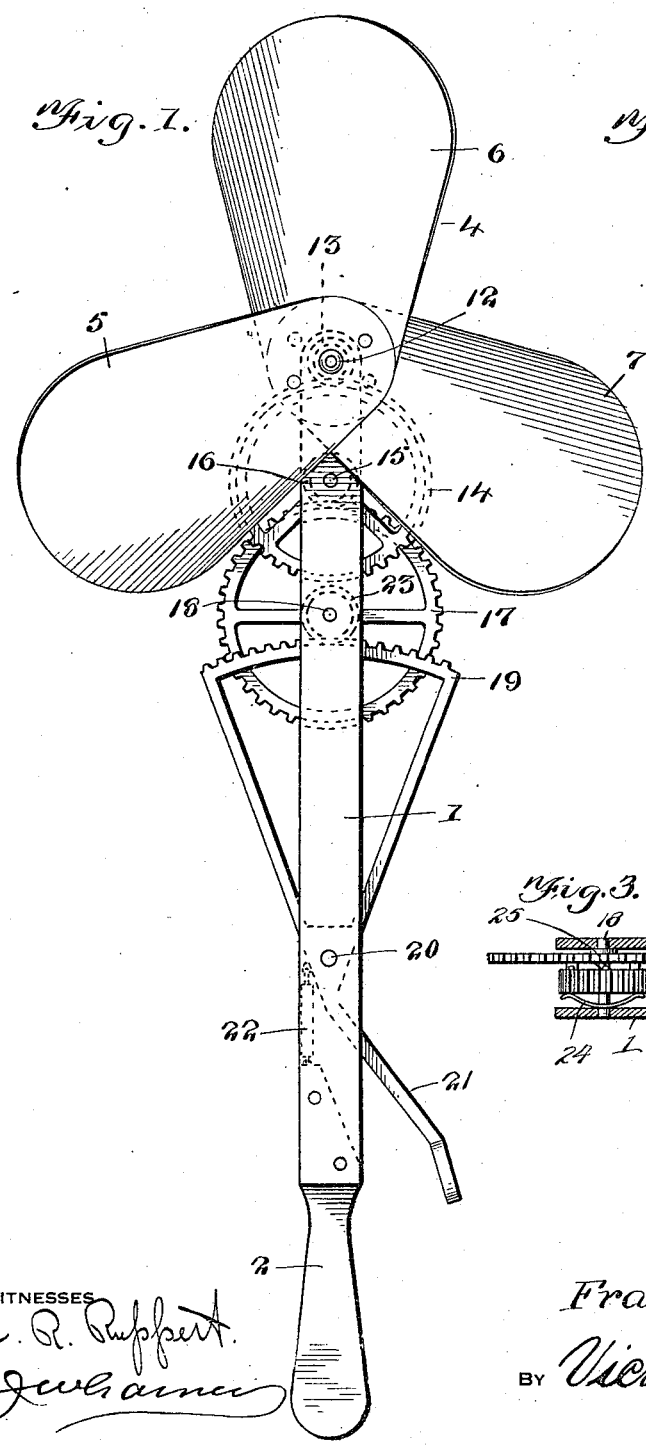
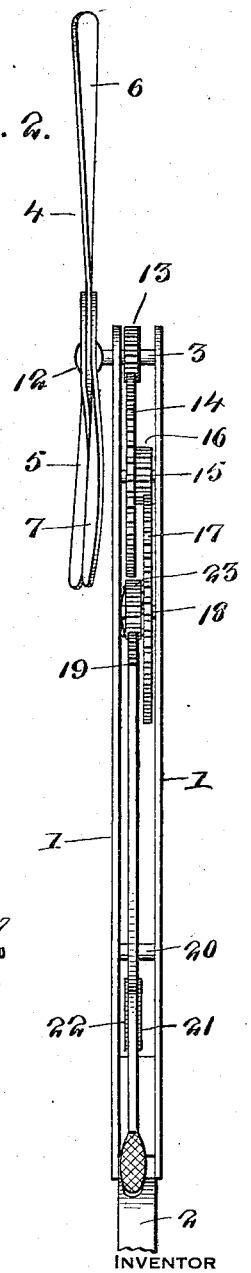
INVENTOR
Frank M. Robb
BY Victor J. Evans
ATTORNEY
WITNESSES

UNITED STATES PATENT OFFICE.

FRANK M. ROBB, OF WESTMONT, QUEBEC, CANADA.

OPERATING MECHANISM FOR FANS.

1,279,443.  Specification of Letters Patent.  Patented Sept. 17, 1918.

Application filed August 10, 1917. Serial No. 185,544.

*To all whom it may concern:*

Be it known that I, FRANK M. ROBB, a subject of the King of Great Britain, residing at Westmont, in the Province of Quebec and Dominion of Canada, have invented new and useful Improvements in Operating Mechanism for Fans, of which the following is a specification.

This invention is an improved mechanical fan embodying a revoluble fan member and manually operated means to cause the fan member to revolve, one object of the invention being to effect improvements in the construction of the frame and another object being to provide improved means for operating the fan member.

The invention consists in the construction, combination and arrangement of devices hereinafter described and claimed.

In the accompanying drawings:—

Figure 1 is a front elevation of a mechanical fan constructed and arranged in accordance with my invention.

Fig. 2 is a side elevation of the same.

Fig. 3 is a detailed sectional view of the motor mechanism.

The frame of my improved mechanical fan comprises a pair of members 1 which are arranged in spaced relation and the lower ends of which are secured on the upper end of a handle 2 which is preferably made of wood. A shaft 3 is mounted in bearing openings near the upper ends of the frame members and is provided at its front end with a revoluble fan element 4 which comprises three radially arranged blades 5, 6 and 7 and a hub 14.

A pinion 13 is secured on the shaft 3 and arranged between the members of the frame. Said pinion is engaged by a spur-gear 14 on an arbor 15 which has its bearings in the frame members. A pinion 16 is fast with the gear 14 and is engaged by a spur-gear 17 on an arbor 18 which arbor is also mounted in bearings in the frame members.

A segment gear 19 has its pivot 20 mounted in bearings in the frame members and said segment gear has a lever 21 and is moved in one direction by a spring 22. Said segment gear engages a slip pinion 23 which is loose on the arbor 18 and which is pressed by a spring 24 into engagement with ratchet teeth 25 on the opposing side of the gear 17.

When the segment gear is turned by the lever 24 in one direction, against the tension of the spring 22, the slip pinion, being engaged with the gear 17 causes said gear to revolve and hence through the instrumentality of the gears 13, 14 and 16 causes the fan element to revolve in one direction. On the reverse stroke of the segment gear which is imparted thereto by the spring 22, the operator releasing his pressure on the lever 21, the slip pinion disengages the gear 17 and hence revolves idly in the reverse direction, the fan continuing to revolve by the momentum imparted thereto by the operating stroke of the lever.

While I have herein shown and described a preferred form of my invention, I would have it understood that changes may be made in the form, proportion and construction of the several parts, without departing from the spirit of my invention and within the scope of the appended claims.

Having thus described my invention, I claim:—

1. In a fan of the class described, a frame having a handle at one end, a revoluble fan element having an axle mounted at the other end of the handle, a segment gear mounted in the frame and having a lever, and a train of gears between the segment gear and the revoluble fan element, said train of gears including a slip pinion engaged with the segment gear, means to lock said pinion to a gear when said pinion is turned in one direction and a spring to normally hold said slip pinion in locked position.

2. In a fan of the class described, a frame having a handle at one end, a revoluble fan element having an axle mounted at the other end of the handle, a segment gear mounted in the frame and having a lever, and a train of gears between the segment gear and the revoluble fan element, said train of gears including a slip pinion engaged with the segment gear, means to lock said pinion to a gear when said pinion is turned in one direction, a spring to normally hold said slip pinion in locked position, and a spring to turn said segment gear in one direction.

In testimony whereof I affix my signature.

FRANK M. ROBB.

Copies of this patent may be obtained for five cents each, by addressing the "Commissioner of Patents, Washington, D. C."